Aug. 15, 1961  C. B. ASKE, JR  2,996,334
WHEEL TRIM AND MULTI-COLOR TIRE TRIM CONSTRUCTION
Filed Dec. 16, 1960  3 Sheets-Sheet 2

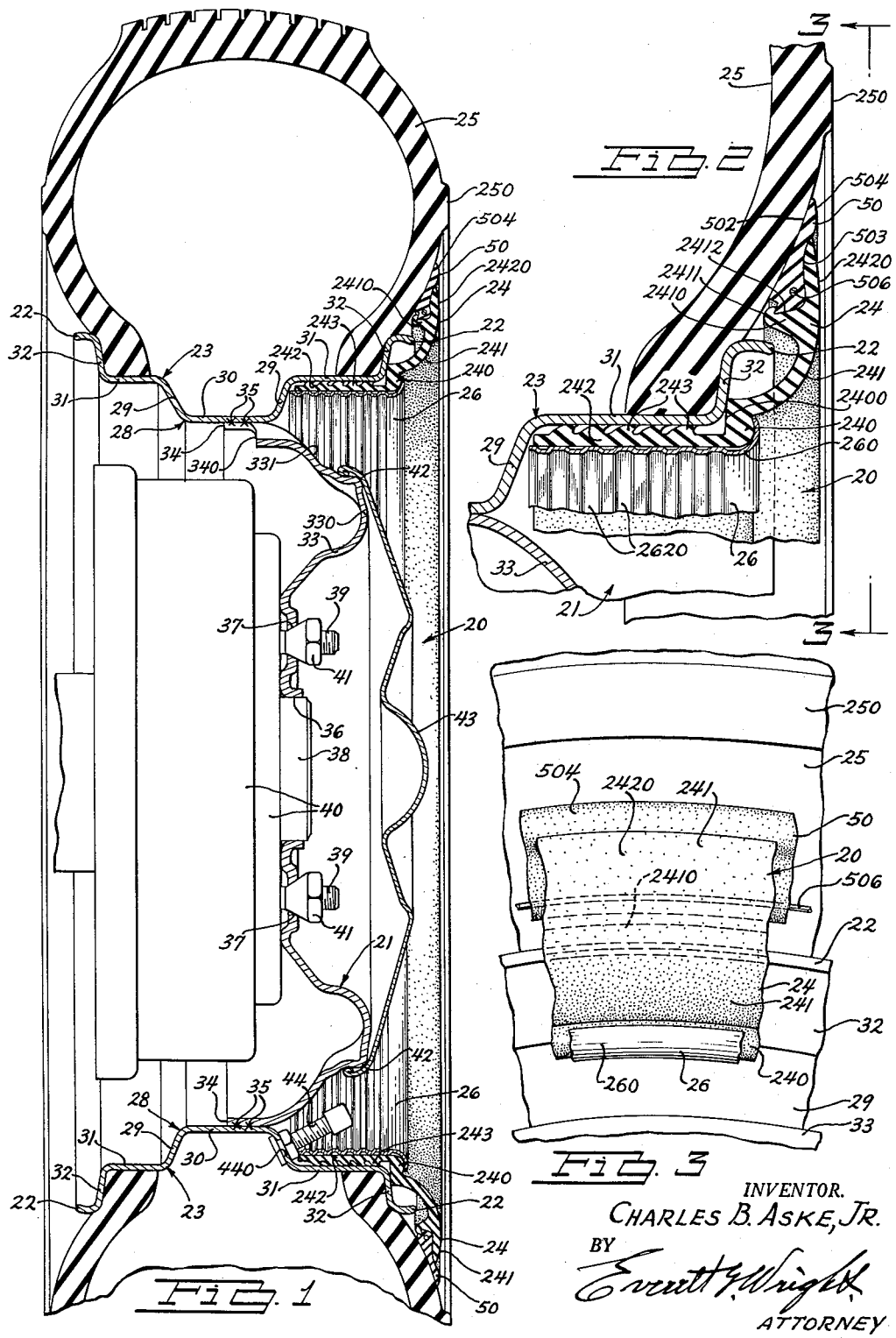

INVENTOR.
CHARLES B. ASKE, JR.
BY
ATTORNEY

Aug. 15, 1961 C. B. ASKE, JR 2,996,334
WHEEL TRIM AND MULTI-COLOR TIRE TRIM CONSTRUCTION
Filed Dec. 16, 1960 3 Sheets-Sheet 3
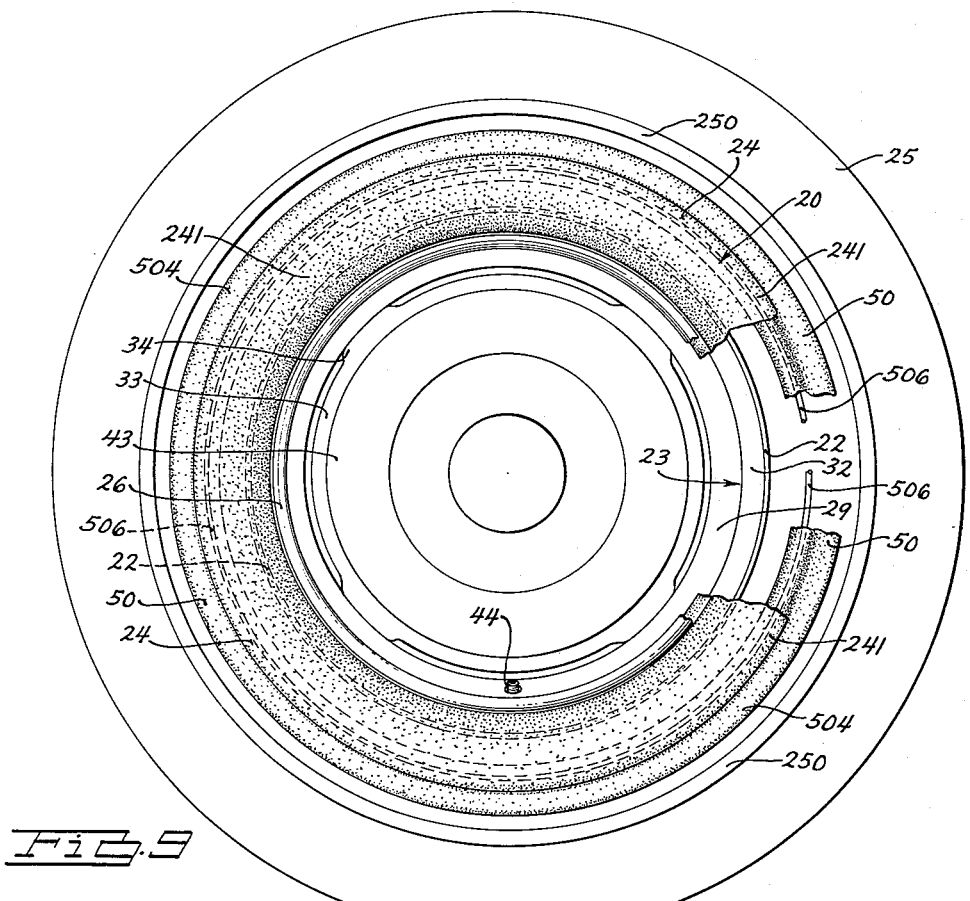
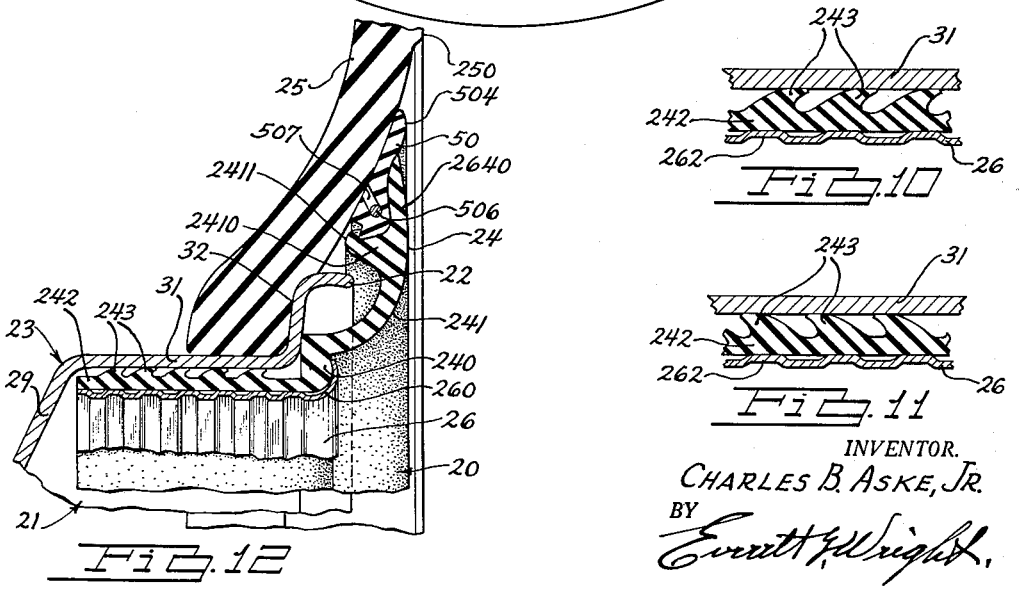
INVENTOR.
CHARLES B. ASKE, JR.
BY
Everett J. Wright,
ATTORNEY United States Patent Office 2,996,334
Patented Aug. 15, 1961

2,996,334
WHEEL TRIM AND MULTI-COLOR TIRE TRIM CONSTRUCTION
Charles B. Aske, Jr., Birmingham, Mich., assignor, by direct and mesne assignments, to Gar Wood Industries, Inc., a corporation of Michigan
Filed Dec. 16, 1960, Ser. No. 76,200
5 Claims. (Cl. 301—37)

This invention relates to improved tire trim-wheel trim construction incorporating a color accent to the tire trim, and is an improvement over the tire trim-wheel trim construction disclosed in application Serial No. 12,391 of Charles B. Aske, Jr. and Edward L. Wood filed March 2, 1960, now Patent No. 2,964,354.

In the instant application, the primary object of the invention is to provide an improved tire trim-wheel trim construction including means for color accenting the tire trim element thereof whereby to present a desirable multi-color tire trim effect.

Another object of the invention is to provide in an extremely simple form means for color accenting the tire trim element of tire trim-wheel trim construction including an annular color accent element and annular seat and gage means for maintaining the color accent element in place concentric with respect to the periphery of the tire trim element.

A further object of the invention is to provide, in a tire trim-wheel trim construction with color accent element, a seat and gage means functioning independently of the wheel rim and tire for maintaining the color accent element concentric with the tire trim element, the said color accent element being further employed to hold the tire trim element off the tire wall and thereby to prevent bleed-through of carbon black from the tire to the tire trim element.

Other objects of the invention will become apparent by reference to the following detailed description taken in connection with the accompanying drawings, in which:

FIG. 1 is a vertical sectional view through a vehicle wheel and tire equipped with wheel rim and tire trim and color accent stripe means embodying the invention presenting a desirable multi-color tire trim effect.

FIG. 2 is an enlarged fragmentary detailed sectional view of the combined wheel rim trim and multi-color tire trim disclosed in FIG. 1.

FIG. 3 is a fragmentary elevation view taken on the line 3—3 of FIG. 2.

FIG. 9 is an elevational view of a vehicle wheel and tire trimmed with the embodiment of the invention disclosed in FIGS. 1–5 inclusive.

FIGS. 10 and 11 are enlarged fragmentary sectional views of the wheel trim and anchorage flange portion of the tire trim-wheel trim construction disclosed in FIG. 2 shown respectively after being mounted on a wheel rim and while being removed therefrom.

FIG. 12 is an enlarged fragmentary cross sectional view similar to FIG. 2 showing another modified form of the invention.

Figure 4:
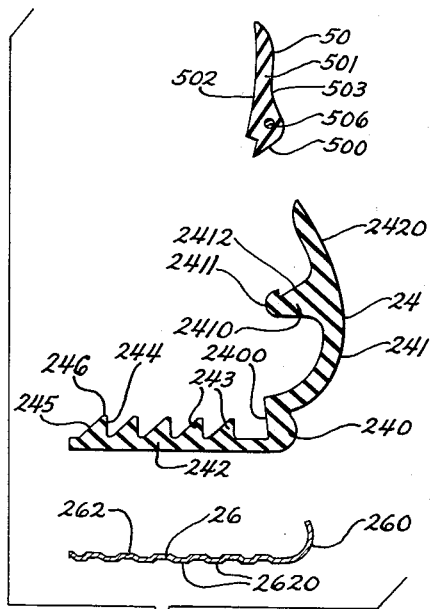
FIG. 4 is an exploded sectional view showing the several elements of the wheel rim and multi-color tire trim disclosed in FIGS. 1–3 inclusive.

Referring now to the drawings wherein like reference numerals refer to like and corresponding parts throughout the several views, the embodiment of the invention disclosed therein for illustrative purposes consists of an improved and highly effective vehicle wheel trim and multi-colored tire trim construction which is disclosed in connection with a typical modern vehicle wheel 21 having a tubeless tire 25 mounted thereon.

The said vehicle wheel 21 has a drop center rim 23 composed of a central channel or drop center element 28 having side walls 29 and a base 30. An annular tire bead seat 31 extends laterally outwardly from each side of the side walls 29 of the drop center 28, each said tire bead seat 31 terminating in a tire bead seat flange 32 extending upwardly therefrom which is curved at its upper portion to form an axially disposed outer lip 22. The said tire bead seat flange 32 is of times referred to as the wheel flange and the said lip 22 is ofttimes referred to as the lip of the wheel rim. Within the drop center element 28 of the wheel rim 23 is a wheel spider 33 having an axially disposed flange 34 which is secured to the central channel 28 of the drop center wheel rim 23 by such means as welding at 35. The said wheel spider 33 is provided with a central hub aperture 36 with the securing stud holes 37 spaced therearound to accommodate respectively the wheel hub 38 and wheel securing studs 39 extending from the brake drum 40 to which the wheel 21 is secured by means of the usual wheel securing nuts 41.

The flange 34 of the wheel spider 33 is generally scalloped out and formed at 340 at intervals around the periphery thereof to provide added structural strength to the vehicle wheel 21, and for brake drum ventilation. The said spider 33 is generally formed with an annular axially outwardly extending collar 330 which is preferably provided with a plurality of hub cap retainer nubs 42 over which a conventional hub cap 43 is sprung for securement onto the vehicle wheel 21. The said spider collar 330 has an annular exposed painted surface 331 extending from the outer periphery of the hub cap 43 to the bottom of the painted drop center wheel rim 23. The particular tire 25 illustrated in the drawings is a modern tubeless tire having a scuff bead 250, and, if a tubeless tire 25 is used on the vehicle wheel 21, a valve stem 44 is mounted in sealed relationship through a valve stem aperture 440 preferably provided in the outer wall 29 of the drop center rim channel 28 of the wheel rim 23.

The particular wheel trim and multi-colored tire trim construction of the invention disclosed throughout the drawings comprises three elements, a tire trim element 24 preferably of rubber or other suitable material which flexes readily but returns immediately after being flexed to its original molded form, a rim trim element 26 preferably of stainless steel or other relatively rigid material, and an accent stripe element 50 of synthetic rubber or the like, such as butyl rubber, which does not readily discolor from the bleed-through of carbon black or other chemicals from the black wall tire 25. The said tire trim element 24 and accent stripe element 50 are preferably of contrasting colors such as white for the tire trim element 24 and red, green, yellow, blue or other color for the accent stripe element 50 which not only contrasts with the color of the tire trime elements but also may be selected to blend with or match the color of the vehicle body or its exterior or interior trim.

The said tire trim element 24 and the rim trim element 26 are preferably assembled into a rim trim and tire trim assembly hereinafter called the wheel trim assembly 20 prior to mounting on the annular tire bead seat 31 of the wheel rim 23 while the accent stripe element 50 is mounted on the outer periphery of an annular axially inwardly disposed seat 2410 preferably formed integral with the side wall portion 241 of the tire trim element 24 preferably after the mounting of the said wheel trim assembly 20 on the vehicle wheel rim 23; however, the said tire trim element 24 of the said wheel trim assembly 20 coacts with the accent stripe element 50 as hereinafter described to assure that the said accent stripe element 50 is maintained in proper position on the vehicle wheel and against the side wall of the tire 25 at all times.

The tire trim element 24 of the wheel trim and multi-colored tire trim of the invention preferably consists of an annular bead portion 240, an annular curved preferably white or other colored side wall portion 241 extending radially outwardly from the said bead portion 240, and an annular anchorage flange portion 242 extending axially inwardly from the said bead portion 240; the said annular side wall portion 241 including an integral annular axially disposed seat 2410, and the said anchorage flange portion 242 including a plurality of circumferential axially spaced teeth 243 disposed radially outwardly therefrom.

Figure 5:
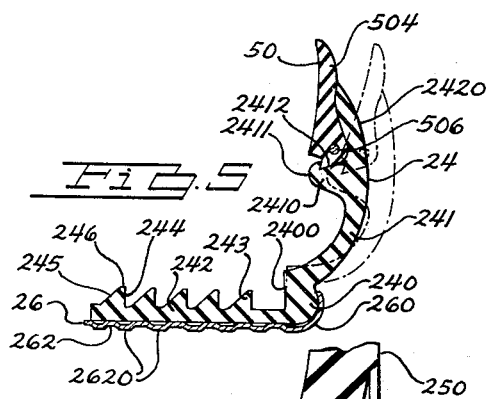
FIG. 5 is an assembled cross sectional view of the wheel rim and multi-color tire trim elements of FIGS. 1–4 inclusive shown in the position assumed by them when not in place on the wheel rim and against the tire wall; the dot and dash lines indicating the approximate extent of flexing of the tire trim element when the assembly is mounted on a vehicle wheel.

The rim trim element 26 of the wheel trim assembly 20 consists of a ring or sleeve including an axially outer bead portion 260 and an annular preferably ornamental sleeve portion 262 extending axially inwardly from the said bead portion 260. The said bead portion 260 of the rim trim 26 conforms with and is juxtaposed to the bead portion 240 of the tire trim element 24 when the annular anchorage flange portion 242 of the tire trim element 24 is telescoped over the annular sleeve portion 262 of the rim trim element 26 to constitute the wheel trim assembly 20. FIG. 4 shows an exploded view of the rim trim element 26, the tire trim element 24 and the accent stripe element 50, while FIG. 5 shows the assembled relationship of the rim trim element 26 and the tire trim element 24 together with the accent stripe element 50 located in the interrelated position assumed by them when mounted on a vehicle wheel. The ornamentation of the sleeve portion 262 of the rim trim element 26 is shown to be circumferentially ribbed at 2620; however, other ornamentation of the rim trim element 26 may be employed to provide other desirable reflective patterns which pick up and reflect the color of the exposed painted surface 331 of the wheel spider 33. If the rim trim element 26 is formed of a strip of metal and rolled into its annular shape, the joint thereof may be secured together by any suitable means such as by welding.

Each of the circumferential radially outwardly disposed teeth 243 of the anchor flange portion 242 of the tire trim element 24 is preferably formed substantially triangular in cross section with a generally radially disposed axially outwardly facing wall 244 and an axially inwardly sloping wall 245. The said radially disposed axially outwardly facing teeth 243 of the tire trim element 24 shown in detail in FIG. 13 are suitably spaced so as to permit the preferably very narrow apex 246 thereof to flex axially outwardly and radially inwardly when the wheel trim assembly 20 is mounted axially onto a vehicle wheel rim 21 as hereinafter described. The apex 246 of each of the said circumferential teeth 243 while preferably very narrow may be slightly truncated to permit them to roll over from their locked position against the inner periphery of the tire bead seat 31 of the wheel rim 23 as shown in FIG. 10 to their unlocked position shown in FIG. 11 to free the gripping of the said tire bead seat 31 by the said circumferential teeth 243 when the said wheel trim assembly 20 is forcibly removed axially from a vehicle wheel 21 as hereinafter described.

The tire trim element 24 and the rim trim element 26 of the wheel trim assembly 20 are of such diameter in respect to each other that the anchorage flange portion 242 of the tire trim element 24 may be telescoped or otherwise firmly anchored in assembled relationship onto the sleeve portion 262 of the rim trim element 26, see FIGS. 1 and 2. When the tire trim element 24 and the wheel trim element 26 are so assembled, the diameter of the apex 246 of the radially disposed axially outwardly facing circumferential teeth 243 is somewhat greater than the internal diameter of the annular tire bead seat 31 of the vehicle wheel 21.

The wheel trim assembly 20 is mounted on the vehicle wheel 21 by forcibly telescoping the rim trim element 26 and the anchorage flange portion 242 of the tire trim element thereof as a unit within the internal annulus of the tire bead seat 31 of the said vehicle wheel 21. This deforms the circumferential teeth 243 of the anchorage flange portion 242 of the tire trim element 24 from their normal attitude shown in FIG. 5 to their gripping position shown in FIGS. 1, 2 and 10. The said tire trim assembly 20 is axially pressed onto the vehicle wheel 21 until the inner axially facing flange 2400 of the bead portion 240 of the tire trim element 24 is located in abutment with the flange 32 of the tire bead seat 31 of the said vehicle wheel 21. The wheel trim assembly 20 is now firmly anchored onto the rim 23 of the vehicle wheel 21, and the curved white or colored side wall portion 241 of the tire trim element 24 overlies but does not contact the lip 22 of the wheel rim 23 of the vehicle wheel 21, and its outer peripheral portion 2420 is flexed toward the outer wall of the tire 25 and into contact with the side wall portion 501 of the accent stripe element 50 when the said accent stripe element 50 is positioned behind the outer peripheral portion of the tire trim element 24 and is seated on the annular axially inwardly disposed annular seat 2410 formed integral with the side wall portion 241 of the tire trim element 24.

The accent stripe element 50 of the embodiment of the invention disclosed in FIGS. 1-5 inclusive is annular in shape and is formed with a base portion 509, a side wall portion 501, is curved at 502 to the average curvature of the side wall of a black wall tire 25, and is curved at 503 complementary to the axial inner face of the outer peripheral portion of the annular white or colored wall 241 of the tire trim element 24 as best shown in FIGS. 1, 2 and 5.

The said accent stripe element 50 is of a color contrasting with the tire trim element 24 and slightly wider than the distance between the outer periphery of the said annular seat 2410 and the outer periphery of the annular white or colored wall 241 of the tire trim element 24 leaving therearound exposed to view an exposed annular accent stripe 504 providing the desirable multi-colored tire trim effect.

The said annular seat 2410 is preferably sufficiently axially shallow so that the annular tip 2411 thereof does not bear against the side wall of the black wall tire 25, thus permitting the annular tire wall portion 240 of the tire trim element which is molded as shown by the full lines in FIG. 5 and is flexed outwardly as shown in the dot and dash lines in FIG. 5 when mounted on the vehicle wheel as shown in FIGS. 1 and 2, to constantly urge the accent stripe element 50 against the side wall of the black wall tire 25.

In the embodiment of the invention disclosed in FIGS. 1-5 inclusive, the outer periphery of the said annular seat 2410 is suitably grooved at 2412 to receive and accommodate the annular inner or base portion 500 of the accent stripe element 50. The said accent stripe 50 is provided with an annular reinforcing ring 506 preferably of a relatively stiff wire which may be molded therein as shown in FIGS. 1-5 inclusive, or, alternately, the said annular wire reinforcement 506 may be a separate element which is inserted in a suitably disposed generally outwardly radially facing annular reentrant groove 507 formed in the said accent stripe element 50, see FIG. 12.

Figure 6:
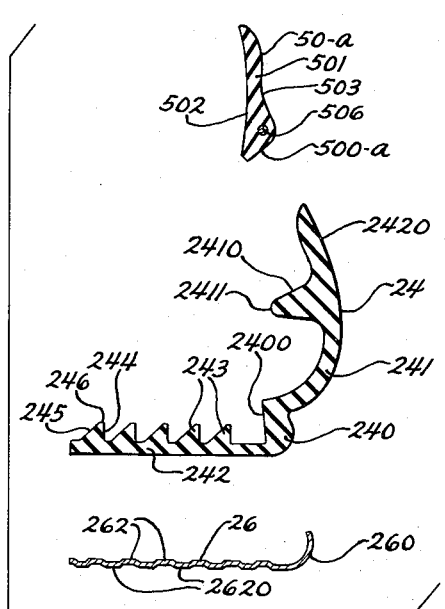
FIGS. 6 and 7 are like and similar to FIGS. 4 and 5 respectively except that they show a modified form of the invention.
Figure 7:
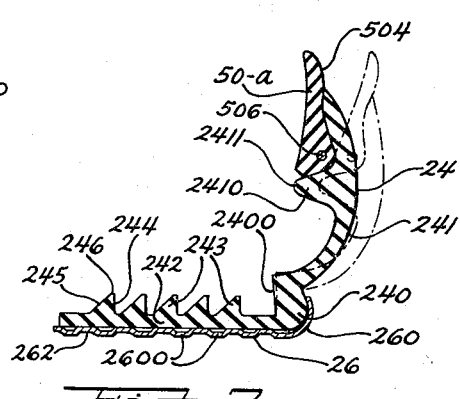
Figure 8:
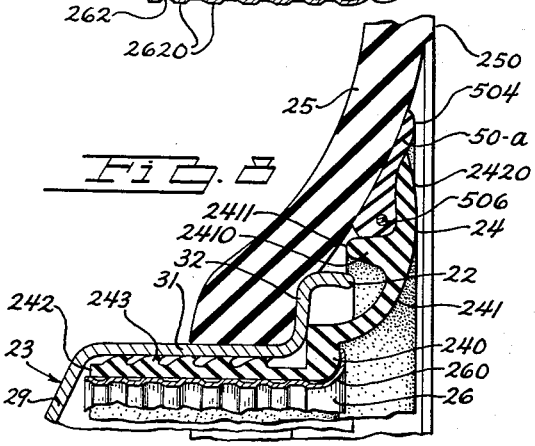
FIG. 8 is an enlarged fragmentary cross sectional view similar to FIG. 2 except that it shows the modified form of the invention disclosed in FIGS 6 and 7 mounted on a vehicle wheel rim and flexed against the tire.

The embodiment of the invention disclosed in FIGS. 6, 7 and 8 is like and similar to the embodiment of the invention disclosed in FIGS. 1–5 inclusive except that no groove 2411 is provided in the outer periphery of the annular seat 2410 of the tire trim element 240, and that the annular base portion 500–a of the accent stripe element 50–a in FIGS. 6, 7 and 8 is formed slightly differently than the accent stripe element 50 of FIGS. 1–5 inclusive. Obviously, the construction for using a loose rather than a molded-in wire ring reinforcement 506 shown in FIG. 12 is also applicable to the embodiment of the invention shown in FIGS. 6, 7 and 8.

The accent stripe element 50 or 50–a, as the case may be, is preferably positioned on the vehicle wheel 21 after the wheel trim assembly 20 is mounted thereon as hereinbefore described. It is then only necessary to flex the annular white or colored side wall portion 241 of the tire trim element 24 axially outwardly and place the inner peripheral portion of an accent stripe element 50 or 50–a on the outer periphery of the annular seat 2410 thereof. The side wall portion 241 of the tire trim element 24 constantly flexes against the accent stripe element 50 or 50–a and holds it in abutment against the side wall of the tire 25. The said accent stripe element 50 or 50–a can be removed from the vehicle wheel 21 by manually flexing the side wall portion 241 of the tire trim element 24 sufficiently outwardly to permit the accent stripe element to be withdrawn therefrom.

To remove the wheel trim assembly 20 from the vehicle wheel 21, the said tire trim assembly 20 is manually pulled axially outwardly therefrom preferably employing a hook-ended instrument or prying instrument to the axially inwardly edge of the rim trim element 26. Initially, a relatively large force is required to move the wheel trim assembly axially outwardly from the vehicle wheel 21 because of the fact that the circumferential teeth 243 of the tire trim element 24 first must be flexed and rolled over from their locked position shown in FIG. 10 to their unlocked position shown in FIG. 11 whereupon the complete removal of the wheel trim assembly 20 from the vehicle wheel 21 becomes relatively easy.

Although but two embodiments of the invention and one modification of both of them have been disclosed and described herein, it is obvious that many changes may be made in the size, shape, arrangement and detail of the various elements of the invention and their inter-relation, all without departing from the spirit and scope thereof as defined by the appended claims.

I claim:

1. In combination with a vehicle wheel including a wheel rim having axially disposed inner and outer tire bead seats and a tire mounted thereon, said wheel rim having an axially outwardly extending lip at the outer periphery thereof, and a wheel and tire trim assembly including means mounting the same on the vehicle wheel, said wheel and tire trim assembly including a resilient annular tire trim element of different color than said tire curved in cross section and flexed axially inwardly in spaced relationship over the lip of the wheel rim toward the outer wall of said tire, an annular axially inwardly disposed seat formed integral with said annular tire trim element disposed radially outwardly from the wheel rim lip and radially inwardly from the outer periphery of said tire trim element, an annular resilient color accent stripe element of a color different than said tire wall and said tire trim element and formed at its axially inner face for positioning against the tire wall when the said accent stripe element is mounted on the annular seat of said tire trim element, said color accent stripe element being formed at its axially outer face to receive in axial abutment the axially curved inner face of the radially outer portion of said tire trim element, the said annular color accent stripe element being being of a width to extend radially outwardly of the outer periphery of the said tire trim element of said wheel and tire trim assembly and present an annular color accent stripe therearound.

2. The combination claimed in claim 1 including in the color accent stripe element an annular reinforcement for preventing circumferential enlargement thereof under centrifugal force.

3. The combination claimed in claim 1 including an annular reinforcing wire molded in the color accent stripe near the inner periphery thereof.

4. The combination claimed in claim 1 in which the color accent stripe has therein a generally radially outwardly open groove, and an annular reinforcing wire disposed in said groove at the bottom thereof.

5. The combination claimed in claim 1 in which the annular axially inwardly disposed seat formed integral with the annular tire trim element is grooved at its radial outer periphery to accommodate the radial inner periphery of said color accent stripe element.

References Cited in the file of this patent

UNITED STATES PATENTS 2,964,354     Aske et al.             Dec. 13, 1960